(12) United States Patent
Mayer et al.

(10) Patent No.: US 11,456,092 B2
(45) Date of Patent: Sep. 27, 2022

(54) ELECTRICALLY CONDUCTIVE CONTACT ELEMENT FOR AN ELECTRIC PLUG CONNECTOR

(71) Applicant: ITT MANUFACTURING ENTERPRISES LLC, Wilmington, DE (US)

(72) Inventors: Stefan Mayer, Waiblingen (DE); Martin Littek, Kernen (DE); Karl Friedrich Albrecht, Schorndorf (DE); Marcus Bihrer, Althengstett (DE); Andreas Zimmermann, Kernen (DE)

(73) Assignee: ITT MANUFACTURING ENTERPRISES LLC., Wilmington, DE (US)

( * ) Notice: Subject to any disclaimer, the term of this patent is extended or adjusted under 35 U.S.C. 154(b) by 870 days.

(21) Appl. No.: 16/332,166

(22) PCT Filed: Aug. 31, 2017

(86) PCT No.: PCT/IB2017/001053
§ 371 (c)(1),
(2) Date: Apr. 23, 2019

(87) PCT Pub. No.: WO2018/046994
PCT Pub. Date: Mar. 15, 2018

(65) Prior Publication Data
US 2019/0252095 A1    Aug. 15, 2019

(30) Foreign Application Priority Data

Sep. 9, 2016  (DE) .................. 10 2016 117 011.9

(51) Int. Cl.
*H01B 7/42* (2006.01)
*H01R 13/00* (2006.01)
(Continued)

(52) U.S. Cl.
CPC .............. *H01B 7/423* (2013.01); *B60L 53/16* (2019.02); *B60L 53/18* (2019.02); *B60L 53/302* (2019.02);
(Continued)

(58) Field of Classification Search
CPC ....... H01B 7/423; H01B 9/006; B60L 53/302; B60L 53/16; B60L 53/18; H01R 13/005;
(Continued)

(56) References Cited

U.S. PATENT DOCUMENTS 2,969,415 A     1/1961  Hartill et al.
6,168,447 B1 *  1/2001  Stepniak ................ H01R 13/53
                                                    439/187
(Continued)

FOREIGN PATENT DOCUMENTS

CN    109417237 B  * 12/2020  .............. B60L 53/16
DE    19921310 A1    11/2000
(Continued)

*Primary Examiner* — Suresh Memula
(74) *Attorney, Agent, or Firm* — Mannava & Kang, P.C

(57) ABSTRACT

The invention relates to an electrically conductive contact element (2) for an electric plug connector. The electrically conductive contact element (2) comprises a contact region (4) for making detachable electric contact with a mating contact element of a mating plug connector, and comprises a cable connecting region (6) for the connection of a cable. The contact element (2) comprises a cooling cavity (24), which opens into a distal opening (22) of the cable connecting region (6) which is arranged opposite the contact region (4).

16 Claims, 8 Drawing Sheets

Figure 1:
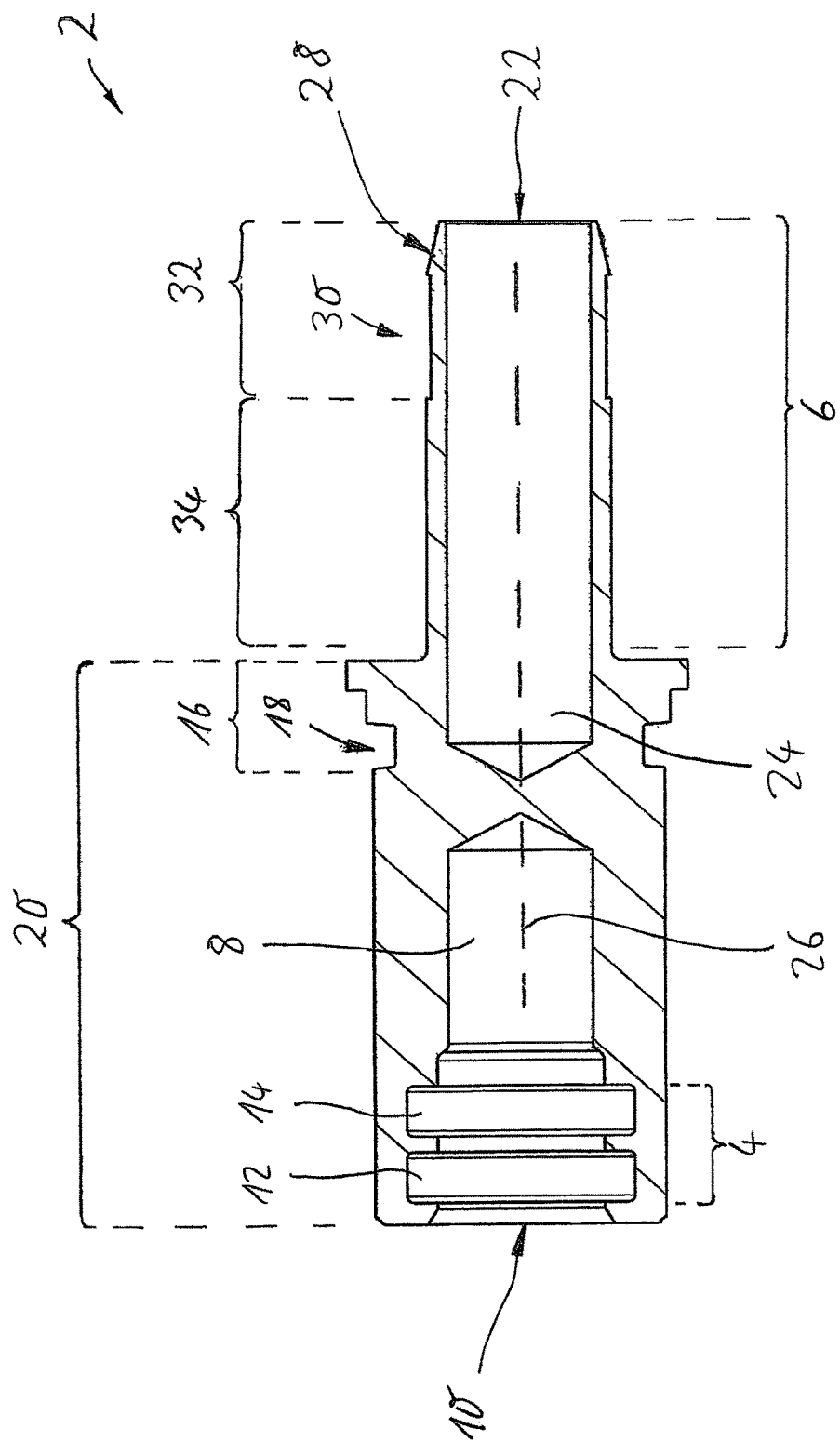

(51) Int. Cl.
  *B60L 53/16* (2019.01)
  *B60L 53/18* (2019.01)
  *B60L 53/302* (2019.01)
  *H01B 9/00* (2006.01)
  *H01R 24/20* (2011.01)
  *H02G 3/03* (2006.01)
  *H01R 24/38* (2011.01)

(52) U.S. Cl.
  CPC .......... *H01B 9/006* (2013.01); *H01R 13/005* (2013.01); *H01R 24/20* (2013.01); *H01R 24/38* (2013.01); *H02G 3/03* (2013.01); *Y02T 10/70* (2013.01); *Y02T 10/7072* (2013.01); *Y02T 90/12* (2013.01); *Y02T 90/14* (2013.01)

(58) Field of Classification Search
  CPC .......... H01R 24/20; H01R 24/38; H02G 3/03; Y02T 10/70; Y02T 10/7072; Y02T 90/12; Y02T 90/14
  USPC .......................................................... 320/109
  See application file for complete search history.

(56) References Cited

U.S. PATENT DOCUMENTS

| | | | |
|---|---|---|---|
| 10,340,709 B2 * | 7/2019 | Dyer | H01M 10/6568 |
| 10,632,861 B2 * | 4/2020 | Beimdieck | H01R 24/20 |
| 10,644,422 B2 * | 5/2020 | Moseke | B60L 53/302 |
| 10,943,711 B2 * | 3/2021 | Heyne | H01B 9/006 |
| 11,084,390 B2 * | 8/2021 | Chou | B60L 53/16 |
| 11,285,828 B2 * | 3/2022 | Hakenberg | H01R 24/58 |
| 2002/0164896 A1 * | 11/2002 | Borgstrom | H01R 13/53 439/183 |
| 2009/0273310 A1 * | 11/2009 | Flack | H01R 24/38 439/668 |
| 2022/0037839 A1 * | 2/2022 | Raymond | H01R 13/10 |
| 2022/0102928 A1 * | 3/2022 | Fiedler | B29C 45/14639 |

FOREIGN PATENT DOCUMENTS

| | | | | |
|---|---|---|---|---|
| DE | 102004033567 A1 | | 1/2006 | |
| DE | 102010045522 A1 | | 3/2012 | |
| DE | 102020206416 A1 | * | 11/2021 | .......... H01R 13/533 |
| EP | 0889548 A2 | | 1/1999 | |
| EP | 3043421 A1 | * | 7/2016 | .......... B60L 11/1818 |
| EP | 3043421 A1 | | 7/2016 | |
| WO | 2012051510 A2 | | 4/2012 | |
| WO | WO-2013131949 A2 | * | 9/2013 | .......... B60L 3/0061 |
| WO | WO-2020114888 A1 | * | 6/2020 | .......... B60L 53/16 |

* cited by examiner

ELECTRICALLY CONDUCTIVE CONTACT ELEMENT FOR AN ELECTRIC PLUG CONNECTOR

The invention relates to an electrically conductive contact element for an electric plug connector, having a cable connected to the contact element according to the preamble of claim 1.

Electrically conductive contact elements are known which comprise a contact region for making detachable electric contact with a mating contact element of a mating plug connector and a cable connecting region for connecting a cable.

For cooling plug connectors and plug connector elements, such as contact elements, it is known that a separate cooling flow feed with a separate heat sink, such as a cooling coil, is disposed in the plug connector.

DE 10 2011 100 389 A1 discloses a charging cable for transmitting electrical energy into an energy storage of an electric or hybrid vehicle. The charging cable comprises a cable sheath, at least one first current conductor, and at least one coolant supply device. The first current conductor and the coolant supply device are arranged within the cable sheath. The charging cable is a cable for direct current transmission.

Therefore, it is an object of the invention to improve the cooling of a contact element for a plug connector.

The object underlying the invention is achieved by an electrically conductive contact element according to claim 1.

It is proposed that the contact element comprises a cooling cavity which opens into a distal opening of the cable connecting region arranged opposite the contact region. In addition, a distal opening of a radially inner tube of a cable passed through the distal opening of the cable connecting region is arranged inside the cooling cavity.

Through the proposed arrangement of the distal opening of the radially inner tube within the cooling cavity, a cooling fluid supplied via the cable to the contact element can be introduced into the contact element. On the one hand, the cooling fluid is thus brought into the vicinity of a connecting section for connection to an electrical conductor of the cable. On the other hand, the cooling fluid can be brought close to the contact region for contacting the mating contact element. This makes it possible to achieve effective cooling of the regions of the contact element in which electric contact leads to a high heat input into the contact element and the components connected to the contact element. In particular, a destruction of the plug connector by excessive heat input is prevented and the service life of the plug connector is increased.

In addition, the electrical conductor is cooled on the full length of the cable from cable end to cable end, which enables a reduction of the conductor cross section of the electrical conductor while maintaining the same power transmission. Furthermore, the number of media connections is reduced to a minimum by the proposed contact element, as a result of which the risk of leakage with concomitant escape of cooling fluid is also reduced.

Furthermore, the proposed contact element contributes to greatly reducing the installation space required for the arrangement of the cooling element, which has an advantageous effect on the overall size of the associated plug connector. With the proposed contact element and a plug connector produced therewith, currents of 350 to 400 A at a voltage of 1000 V can readily be transmitted with appropriate cooling of the contact element, whereby a high charging power for an energy storage can be provided. Charging times of energy storages for motor vehicles, for example, can be greatly reduced by this provision of a high charging power.

An advantageous embodiment is characterized in that the cable connecting region comprises a circumferential connecting section, wherein the circumferential connecting section is arranged proximally with respect to the opening. An electrical conductor of the cable electrically and mechanically contacts the circumferential connecting section. The proximally arranged connecting section enables an arrangement of the electrical conductor which is coaxial to the cooling cavity. In this way, the connecting section can be cooled, while only separated through a wall of the cable connecting region, via the cooling fluid flowing in the cooling cavity.

An advantageous embodiment is characterized in that the cable connecting region comprises a circumferential sealing section. A distal end of a tube, surrounding the radially inner tube, of the cable is arranged on the sealing section in a fluid-tight manner. Thus, the risk of leakage is reduced considerably. An advantageous embodiment is characterized in that a main body comprises the contact region having a contact socket, wherein the cooling cavity extends into the main body. The effect of the cooling fluid thus extends advantageously over the main body up to the contact socket.

An advantageous alternative embodiment is characterized in that the cooling cavity extends into a contact pin of the contact region. In this way, the cooling fluid can flow into the interior of the contact pin and thus advantageously contribute to cooling.

An advantageous embodiment is characterized in that the cooling cavity is designed as a blind bore. As a result, both manufacturing costs for the contact element and assembly costs for arranging the cable on the contact element can be reduced and the desired cooling effect can be provided at the same time.

An advantageous embodiment is characterized in that a first volume within the tube forms a section of an inlet or return flow for the cooling fluid, wherein a second volume between an outer wall of the tube and an inner wall of the cooling cavity forms a section of a return flow or inlet for the cooling fluid. A cost-effective and efficient cooling of the contact element is thus realized.

A spacing means between the radially inner tube and the tube surrounding the radially inner tube advantageously ensures in one embodiment that the return flow remains open. The inlet is preferably arranged centrally within the inner tube, which ensures by means of the steady flow of cooling fluid that the inlet remains open. By means of the return flow of the cooling fluid past the inner wall of the cooling cavity, an immediate cooling of the cable connecting region is achieved.

A further aspect of the invention relates to a charging station for electrically charging a motor vehicle, comprising: a stationary unit; a plug connector with at least two of the proposed electrically conductive contact elements; and a charging cable arranged between the plug connector and the stationary unit.

Figure 2:
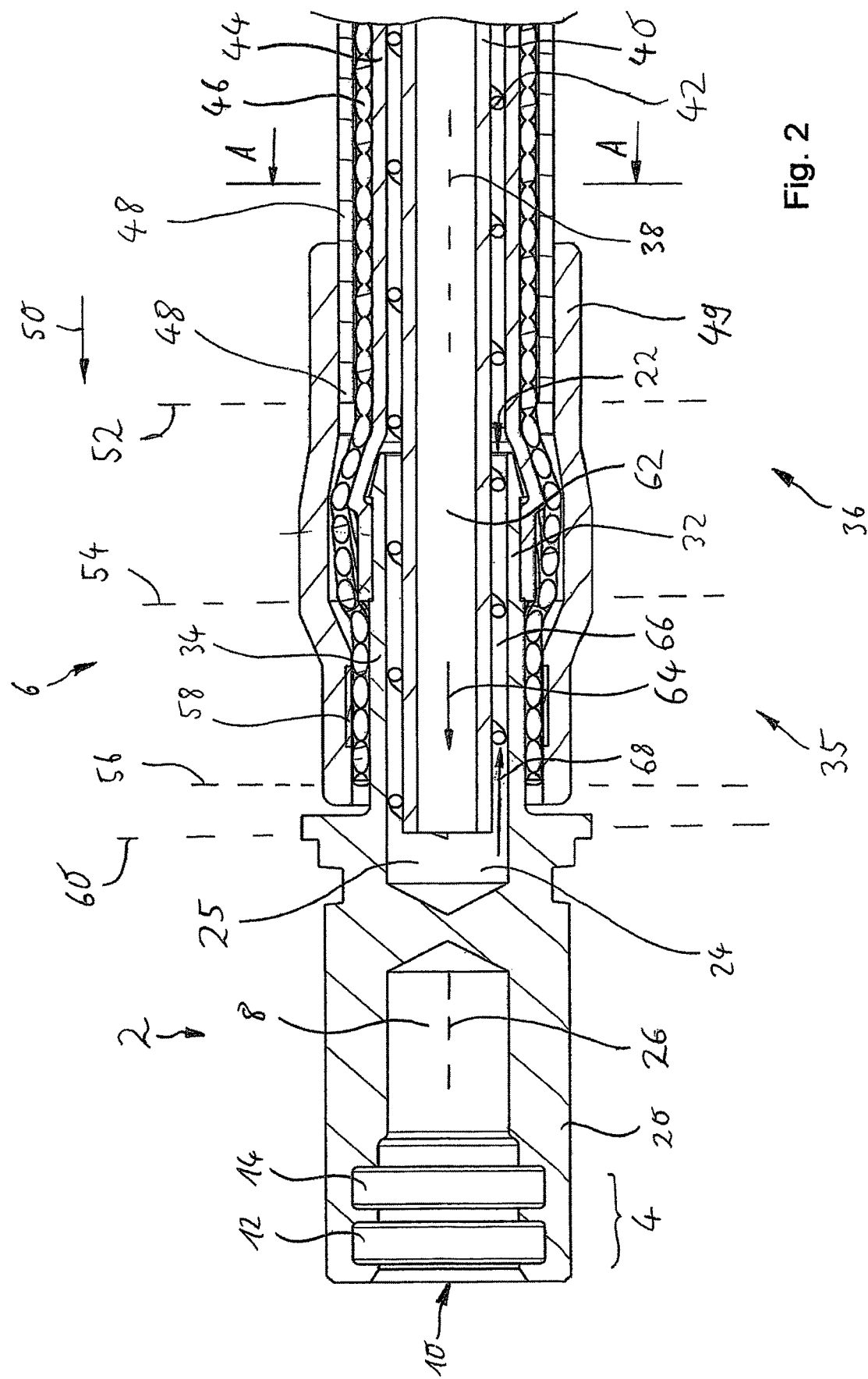
Figure 4:
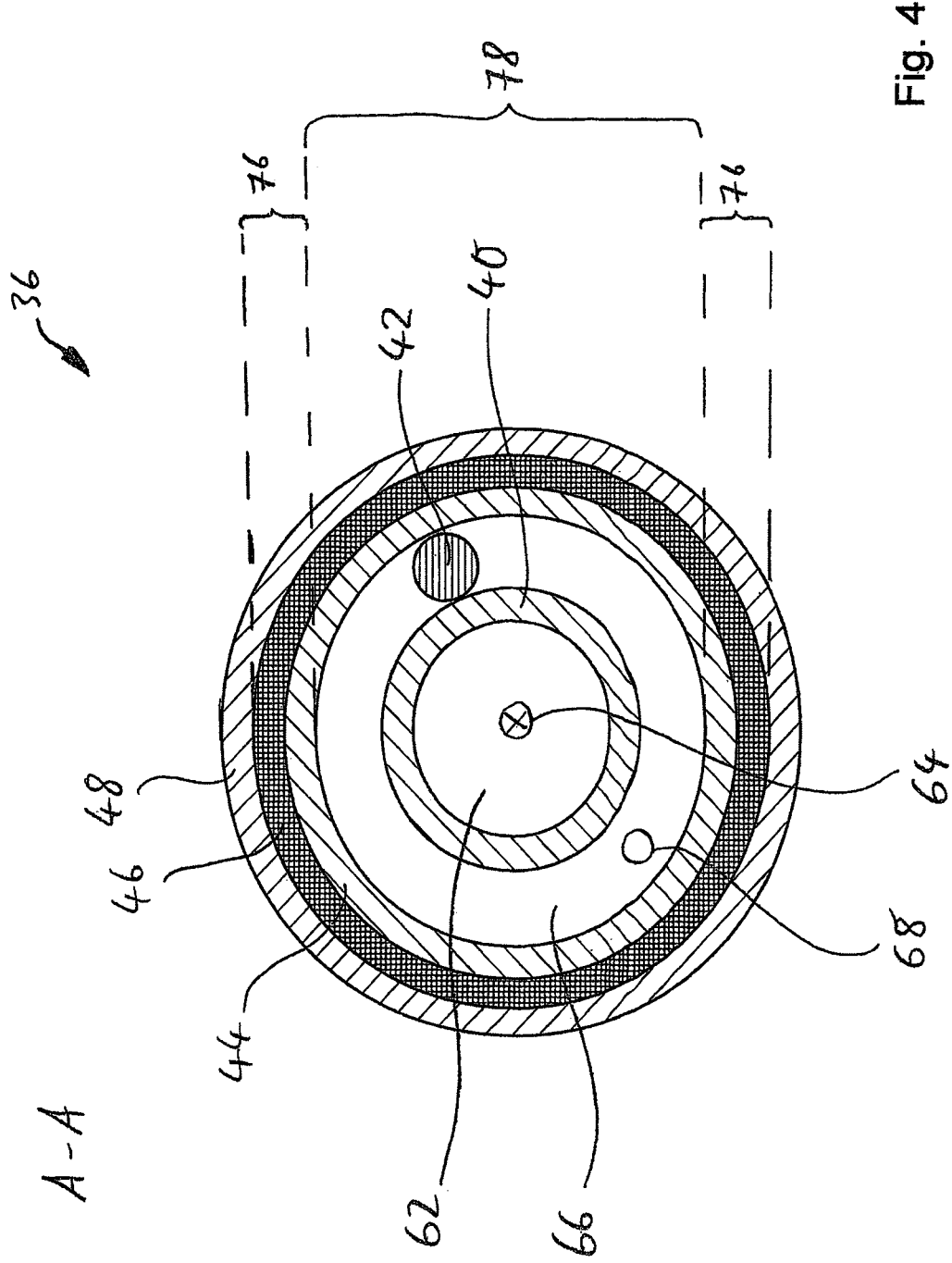
Figure 5:
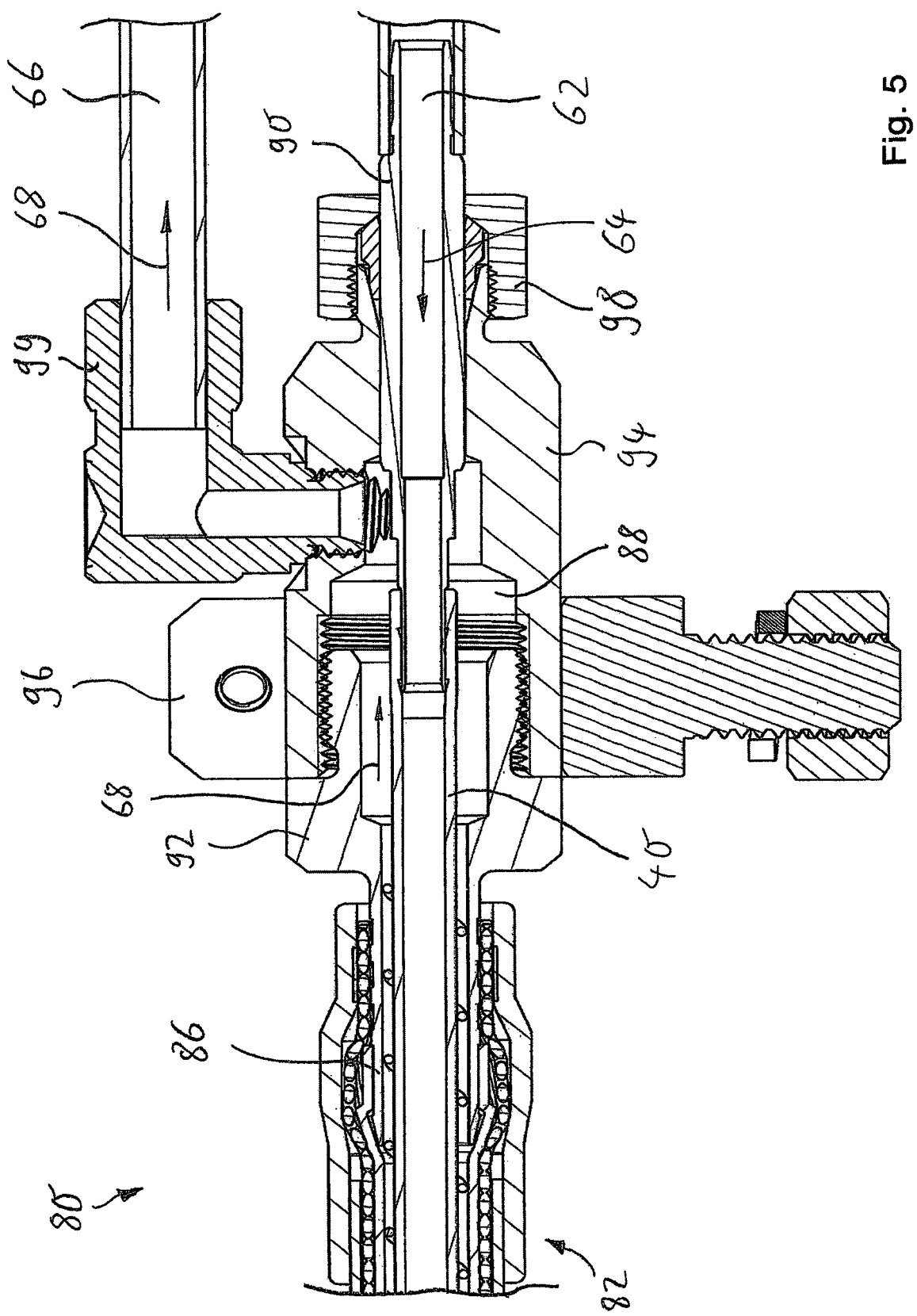

Further advantageous embodiments, features and advantages of the invention can be found in the following description of the drawing. For functionally equivalent features, the same reference signs are used in all figures, even in the case of different embodiments. Shown in the drawing are:

FIG. 1 a schematic longitudinal section of an electrically conductive contact element;

FIGS. 2, 3, 7 and 8 each a schematic longitudinal section of a contact element having a cable end of a cable arranged thereon;

FIG. 4 a cross section of the cable of FIG. 2;

FIG. 5 a schematic cross-sectional view of connecting device; and

Figure 6:
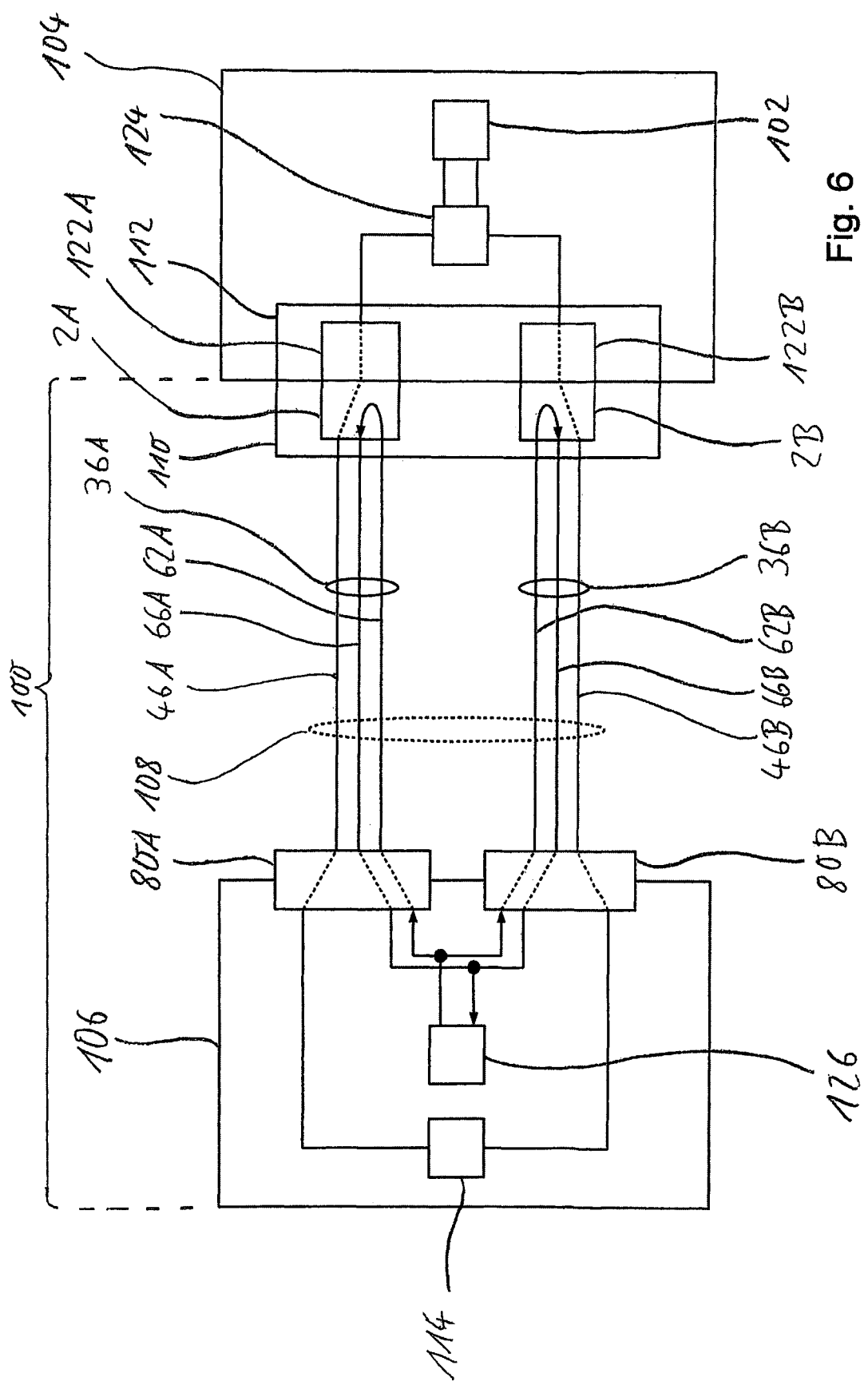

FIG. 6 in schematic form, a charging station for charging an energy storage, particularly a battery, of a motor vehicle.

FIG. 1 shows a schematic longitudinal section of an electrically conductive contact element 2 for an electric plug connector. The contact element 2 comprises a contact region 4 for contacting a mating contact element of a mating plug connector and a cable connecting region 6 for connecting a cable (not shown). Here, the contact region 4 is part of a contact socket 8 into which a contact pin (not shown) can be introduced as a mating contact element of the mating plug connector via a socket opening 10. The contact region 4 comprises two annular grooves 12 and 14 which are embodied inside the contact socket 8 and into which annular contact rings (not shown) can respectively be introduced. The contact rings establish an electrically conductive connection between the contact pin introduced into the contact socket 8 and the contact element 2. Of course, as explained below, the contact region 4 can also be designed as a contact pin in order to be introduced into a socket as a mating contact element. Of course, other contact principles are also conceivable. For example, slotted contacts or contacts with contact springs can be used.

Between the contact region 4 and the cable connecting region 6, the contact element 2 comprises a fastening section 16 with a groove-shaped recess 18 running transversely to the longitudinal extent of the contact element 2, wherein the recess 18 is a groove for receiving an O-ring (not shown). By means of this O-ring, a seal is created between the insulating body and the contact element 2. In the region of the fastening section 16, the contact element 2 is held in the plug connector.

The contact region 4 and the fastening section 16 are part of a main body 20. From the main body 20, the cable connecting region 6 projects substantially in the form of a hollow cylinder and ends in a distal opening 22. The distal opening 22 opens a cooling cavity 24, which extends into the main body 20 along a central longitudinal axis 26 of the contact element 2. The cooling cavity 24 is designed as a blind bore.

Starting from the opening 22, a diameter extension 28 is provided on the circumferential side. The diameter extension 28 essentially has the shape of a lateral surface of a straight circular truncated cone, wherein the circular truncated cone tapers in the distal direction. A circumferential annular groove 30 proximally adjoins the diameter extension 28. The diameter extension 28 and the annular groove 30 form a circumferential distal sealing section 32. A circumferential connecting section 34 for making contact with an electrical conductor of the cable proximally adjoins the sealing section 32.

FIG. 2 shows a schematic longitudinal section of the contact element 2 with a cable end 35 of a cable 36 arranged thereon. The cable 36 is constructed substantially concentrically about a central longitudinal axis 38. The central longitudinal axis 38 of the cable 36 or cable end 35 coincides here with the central longitudinal axis 26 of the contact element 2. Radially outwards, starting from the central longitudinal axis 38, the cable 36 comprises a first inner tube 40, a spacing means 42 extending spirally along the central longitudinal axis 38, a second inner tube 44, an electrical conductor 46 designed as a conductor braid, and an outer jacket 48. In a connection direction 50, the cable end 35 is stripped just before the opening 22. Accordingly, the outer jacket 48 terminates in a termination 52.

A radially outer section of the cable end 35 comprising the second inner tube 44 and the electrical conductor 46 extends in the connection direction 50 outside of the opening 22 around the cable connecting region 6 of the contact element 2. Thus, the radially outer section of the cable end 35 surrounds the cable connecting region 6 of the contact element 2. At the sealing section 32, the second inner tube 44 is arranged in a fluid-tight manner toward its distal end 54.

Toward its terminal 56, the electrical conductor 46 is arranged on the connecting section 34 by means of a cable clamp 58. The cable clamp 58 presses the cable braid of the electrical conductor 46 radially inward and thus establishes a secure electric contact between the electrical conductor 46 and the connecting section 34. Of course, instead of or in addition to the provisioning of the cable clamp 58, the electrical conductor 46 can be welded to the connecting section 34 in order to establish a material connection. A radially inner section of the cable end 35 comprises the first inner tube 40 and the spacing means 42. The radially inner section of the cable end 35 projects with its distal opening 60 into the cooling cavity 24. In particular, an opening of the first inner tube 40 projects in the proximal direction of the contact element 2 beyond the outer electrical connecting section 34 into the cooling cavity 24.

A substantially cylindrical inner space of the first inner tube 40 forms an inlet 62 for a cooling fluid. The cooling fluid is preferably electrically insulating and may be a gas or a liquid. The cooling fluid is pumped into the inlet 62 according to an arrow 64. The spacing means 42 ensures, that a return flow 66 arranged radially outside of the inlet 62 remains open. According to an arrow 68, the cooling fluid supplied via the inlet 62 into the cooling cavity 24 is supplied into the return flow 66. The return flow 66 is formed in the cable 36 itself by a hollow cylindrical volume between an outer wall of the first tube 40 and an inner wall of the second tube 44. A reverse region 25 for the cooling fluid is defined by the blind hole end of the cooling cavity 24 and the distal opening 60. In the region of the cable connecting region 6, the return flow 66 is formed by a substantially hollow cylindrical volume between the outer wall of the first inner tube 40 and an inner wall of the cooling cavity 24 of the cable connecting region 6. In the region of the cable end 35, the cable 36 connected in this manner to the contact element 2 is surrounded by a shrink tube 49. Of course, the space outside the first tube 40 can also be used for an inlet of the cooling fluid and the inner space of the first tube 40 can also be used for a return flow of the cooling fluid.

Figure 3:
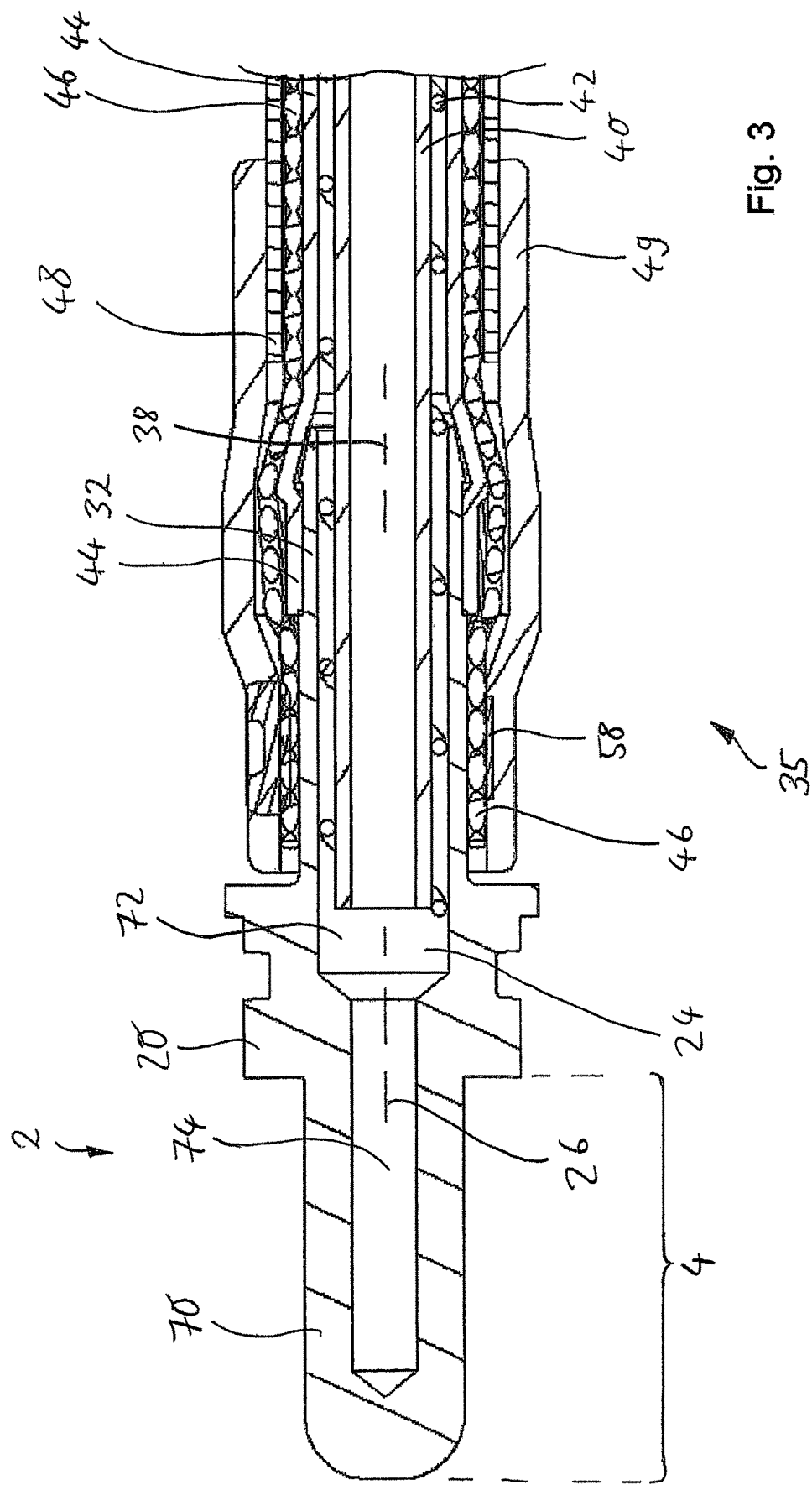

FIG. 3 shows another schematic longitudinal section of an embodiment of the contact element 2 with the cable end 35 of cable 36 arranged thereon. In contrast to FIG. 2, the contact element 2 of FIG. 3 comprises, instead of a contact socket 8, a contact pin 70 which forms the contact region 4. The contact pin 70 can be fed to a corresponding contact socket of a mating plug connector. Furthermore, the cooling cavity 24 is designed as a two-stage blind bore, wherein a first blind bore 72 projects into the main body 20 of the contact element 2. The first blind bore 72 is adjoined by a second blind bore 74 which has a smaller cross section than the first blind bore 72. The second blind bore 74 extends into the contact pin 70.

FIG. 4 shows a cross section A-A of the cable 36 from FIG. 2. The radially outer section 76 of the cable 36 comprises the electrical conductor 46 and the second inner tube 44. The outer section 76 is surrounded by the outer jacket 48. Radially inward, the radially inner section 78 adjoins the radially outer section 76. The radially inner section 78 comprises the spacing means 42 and the inner tube 40.

FIG. 5 shows a schematic cross-sectional view of a connecting device 80 on which a second cable end 82 of the cable 36 is arranged. The connecting device 80 has a further hollow cylindrical cable connecting region 86 on which the cable end 82 is arranged substantially analogously to the FIGS. 2 and 3. The first inner tube 40 projects into an inner space 88 and is slipped over a connecting pipe 90.

The cable connecting region 86 is part of an electrically conductive connecting element 92. A base body 94 has a female thread in the region of the inner space 88. The connecting element 92 has a male thread which faces away from the cable 36 and can be screwed into the female thread of the base body 94 until contact is established. The connecting element 92 and/or the base body 94 is/are electrically conductively connected with a current clamp 96. The base body 94 is designed to be electrically conductive.

The inlet 62 and the return flow 66 are each connected to the base body 94 in a fluid-tight manner with connecting elements 98 and 99 of electrically insulating design. The inlet 62 and the return flow 66 are connected to a cooling fluid pump (not shown).

FIG. 6 diagrammatically shows a charging station 100 for charging an energy storage 102, particularly a battery, of a motor vehicle 104. The charging station 100 comprises a stationary unit 106, a charging cable 108 permanently connected to the stationary unit 106, and a plug connector 110. The plug connector 110 is provided for connection to a mating plug connector 112 of the motor vehicle 104.

After a completed charging process of the energy storage 102, the plug connector 110 is detached from the mating plug connector 112.

For example, a first power electronics 114 of the stationary unit 106 is connected to a public or private power grid and generates a direct current. The stationary unit 106 comprises two connecting devices 80A and 80B according to FIG. 5, which connect the power electronics 114 to the electrical conductors 46A and 46B of the respective cables 36A and 36B according to FIG. 4. The contact elements 2A and 2B of the plug connector 110 according to FIGS. 1 through 3 are respectively connected to a mating contact element 122A and 122B of the mating plug connector 112. The mating contact elements 122A, 122B are each electrically conductively connected to a second power electronics 124 of the motor vehicle 104. The generated direct current thus flows from the first power electronics 114 of the charging station 100 to the second power electronics 124 of the motor vehicle 104. The power electronics 124 charges the energy storage 102 as a function of the supplied electrical energy.

The stationary unit 106 further comprises the cooling fluid pump 126. The cooling fluid is pumped into the respective inlets 62A and 62B of the cables 36A, 36B via the connecting devices 80A and 80B. For this purpose, the cooling fluid pump 126 extracts the cooling fluid from the return flows 66A and 66B of the cables 36A, 36B. The cooling fluid is supplied into the contact elements 2A and 2B from where it returns to the stationary unit 106 via the respective return flows 66A, 66B.

Figure 7:
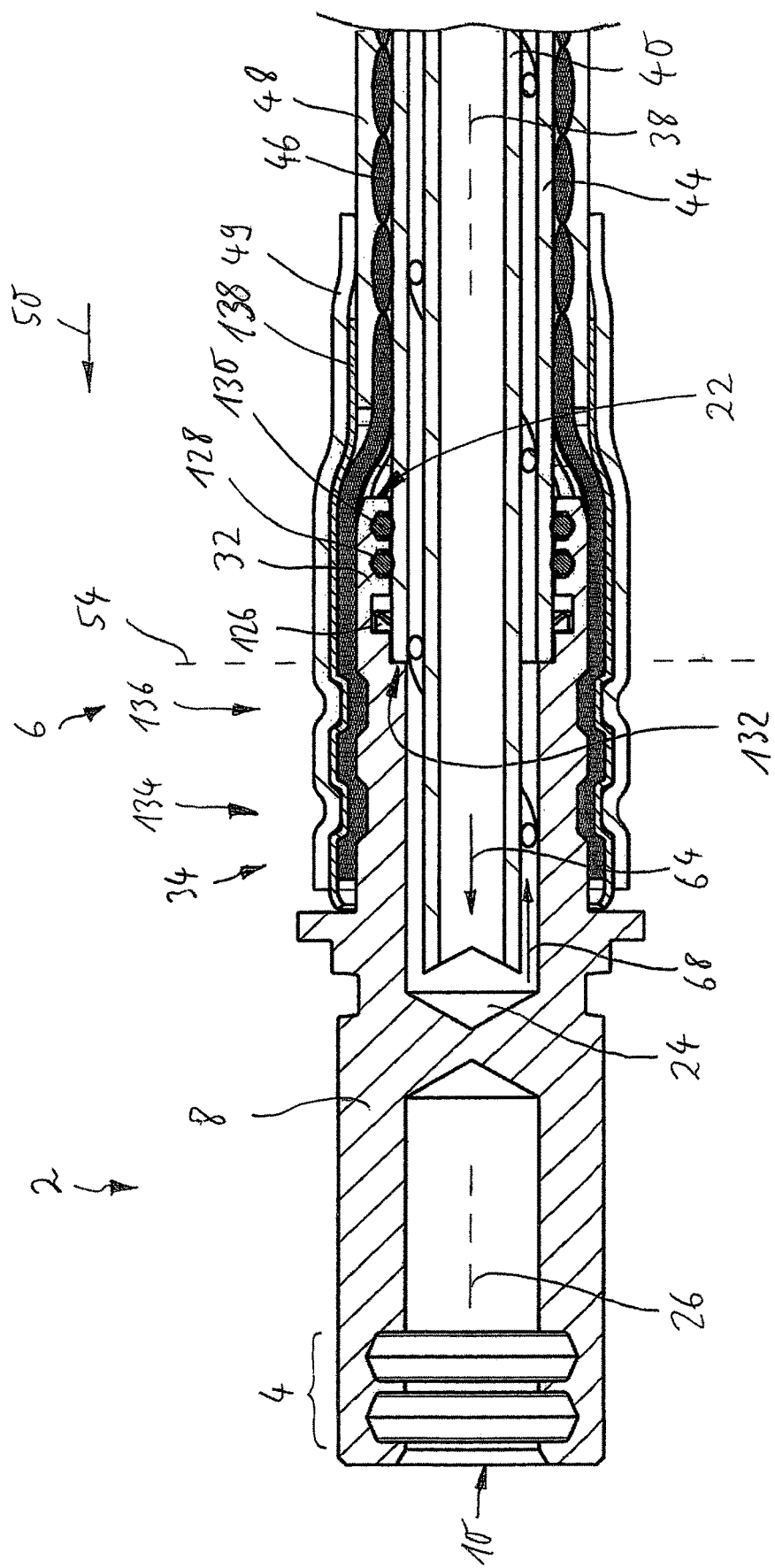

FIG. 7 shows a schematic longitudinal section of the contact element 2 with a cable end 35 of a cable 36 arranged thereon. In contrast to FIG. 2, the sealing section 32 is arranged radially inward within the blind bore for the cooling cavity 24. A tensioning ring 126 and two O-rings 128 and 130 abut in a fluid-tight manner against an outer wall of the distal end 54 of the second tube 44. The second tube 44 has sufficient self-tension to counteract the force applied radially outward by the tensioning ring 126 and the two O-rings 128 and 130. The tensioning ring 126 and the two O-rings 128 and 130 are correspondingly arranged in inner grooves of the sealing section 32. The cooling cavity 24 transitions into the inner sealing section 32 by means of a change of diameter 132.

The connecting section 34 of the contact element 2 comprises two annular beads 134 and 136. Furthermore, an electrically conductive metal sleeve 138 is arranged in the cable connecting region 6 between the shrink tube 49 and the electrical conductor 46. In the region of the beads 134 and 136, the composite of electrical conductor 46 and metal sleeve 138 is crimped so as to project into beads 134 and 136. The shrink tube 24 insulates the electric contact in the region of the connecting section 34. This improves the mechanical stability of the connection between contact elements 2 and cable 36. Moreover, the metal sleeve 138 allows current flow between the electrical conductor 46 and the connecting section 34 to be circumferentially substantially the same, thereby reducing the risk of formation of isolated spots with a high input of thermal energy.

Figure 8:
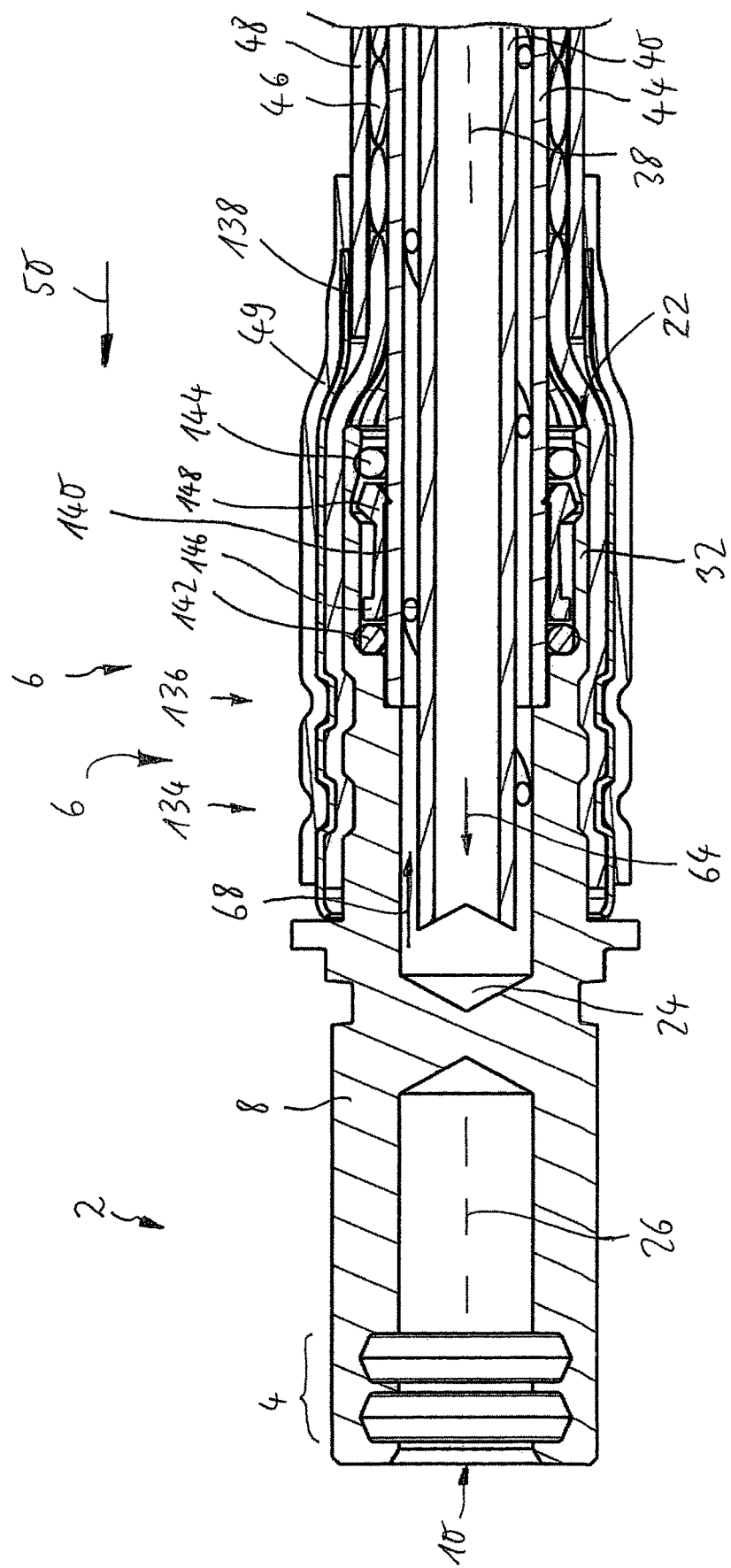

FIG. 8 shows a schematic longitudinal section of the contact element 2 with a cable end 35 of a cable 36 arranged thereon. In contrast to FIG. 7, a clamping sleeve 140 is arranged in the inner sealing section 32 between two O-rings 142 and 144, wherein the sealing section 32 has a corresponding inner contour. The clamping sleeve 140 is braced with a first region 146 on an inner wall of the sealing section 32 in order to clamp the second tube 44 in a fluid-tight manner with a second region 148 spaced from the first region in the longitudinal direction of the sleeve.

The invention claimed is:

1. An electrically conductive contact element for an electric plug connector with a cable connected to the electrically conductive contact element, comprising:
   a contact region for making detachable electric contact with a mating contact element of a mating plug connector;
   a cable connecting region for connecting the cable to the electrically conductive contact element; and
   a cooling cavity, wherein
   the cooling cavity opens into a distal opening of the cable connecting region arranged opposite the contact region,
   the cooling cavity extends into a contact pin of the contact region, and a distal opening of a radially inner tube of the cable is guided through the distal opening of the cable connecting region and arranged inside the cooling cavity.

2. The electrically conductive contact element according to claim 1, wherein the cable connecting region comprises a circumferential connecting section, the circumferential connecting section is proximally arranged with respect to the distal opening of the cable connecting region, and wherein an electrical conductor of the cable is in electrical and mechanical contact with the circumferential connecting section.

3. The electrically conductive contact element according to claim 1, wherein the cable connecting region comprises a sealing section, wherein a distal end of a tube of the cable surrounding the radially inner tube is arranged in a fluid-tight manner on the sealing section.

4. The electrically conductive contact element according to any of claim 1, wherein a main body comprises the contact region having a contact socket and wherein the cooling cavity extends into the main body.

5. The electrically conductive contact element according to claim 1, any of the preceding claims, wherein the cooling cavity is formed as a blind bore.

6. The electrically conductive contact element according to claim 1, any of the preceding claims, wherein a first volume within the radially inner tube forms a section of an inlet or return flow for the cooling fluid, and wherein a second volume between an outer wall of the tube and an inner wall of the cooling cavity forms a section of a return flow or inlet for the cooling fluid.

7. A charging station for electrically charging a motor vehicle, comprising:
- a stationary unit;
- the a plug connector having at least two electrically conductive contact elements, wherein each of the at least two electrically conductive contact elements comprises:
  - a contact region for making detachable electric contact with a mating contact element of a mating plug connector;
  - a cable connecting region for connecting a cable to the electrically conductive contact element and
  - a cooling cavity, wherein
    - the cooling cavity opens into a distal opening of the cable connecting region arranged opposite the contact region,
    - the cooling cavity extends into a contact pin of the contact region, and
    - a distal opening of a radially inner tube of the cable is guided through the distal opening of the cable connecting region and arranged inside the cooling cavity; and
- a charging cable arranged between the plug connector and the stationary unit and comprising at least two cables arranged on the at least two electrically conductive contact elements.

8. The charging station according to claim 7, wherein the cable connecting region comprises a circumferential connecting section, the circumferential connecting section is proximally arranged with respect to the distal opening of the cable connecting region, and an electrical conductor of the cable is in electrical and mechanical contact with the circumferential connecting section.

9. The charging station according to claim 7, wherein the cooling cavity is formed as a blind bore.

10. The charging station according to claim 7, wherein a first volume within the radially inner tube forms a section of an inlet or return flow for the cooling fluid, and a second volume between an outer wall of the tube and an inner wall of the cooling cavity forms a section of a return flow or inlet for the cooling fluid.

11. An electrically conductive contact element for an electric plug connector with a cable connected to the electrically conductive contact element, comprising:
- a contact region for making detachable electric contact with a mating contact element of a mating plug connector;
- a cable connecting region for connecting the cable to the electrically conductive contact element; and
- a cooling cavity, wherein
  - the cooling cavity opens into a distal opening of the cable connecting region arranged opposite the contact region,
  - the cable connecting region comprises a sealing section, wherein a distal end of a tube of the cable surrounding the radially inner tube is arranged in a fluid-tight manner on the sealing section, and
  - a distal opening of a radially inner tube of the cable is guided through the distal opening of the cable connecting region and arranged inside the cooling cavity.

12. The electrically conductive contact element according to claim 11, wherein the cable connecting region comprises a circumferential connecting section, the circumferential connecting section is proximally arranged with respect to the distal opening of the cable connecting region, and an electrical conductor of the cable is in electrical and mechanical contact with the circumferential connecting section.

13. The electrically conductive contact element according to claim 11, wherein a main body comprises the contact region having a contact socket and the cooling cavity extends into the main body.

14. The electrically conductive contact element according to claim 11, wherein the cooling cavity extends into a contact pin of the contact region.

15. The electrically conductive contact element according to claim 11, wherein the cooling cavity is formed as a blind bore.

16. The electrically conductive contact element according to claim 11, wherein a first volume within the radially inner tube forms a section of an inlet or return flow for the cooling fluid, and a second volume between an outer wall of the tube and an inner wall of the cooling cavity forms a section of a return flow or inlet for the cooling fluid.

* * * * *